June 21, 1966  B. C. KEMPSON  3,256,747
INFINITELY VARIABLE TRANSMISSION
Filed Jan. 7, 1964
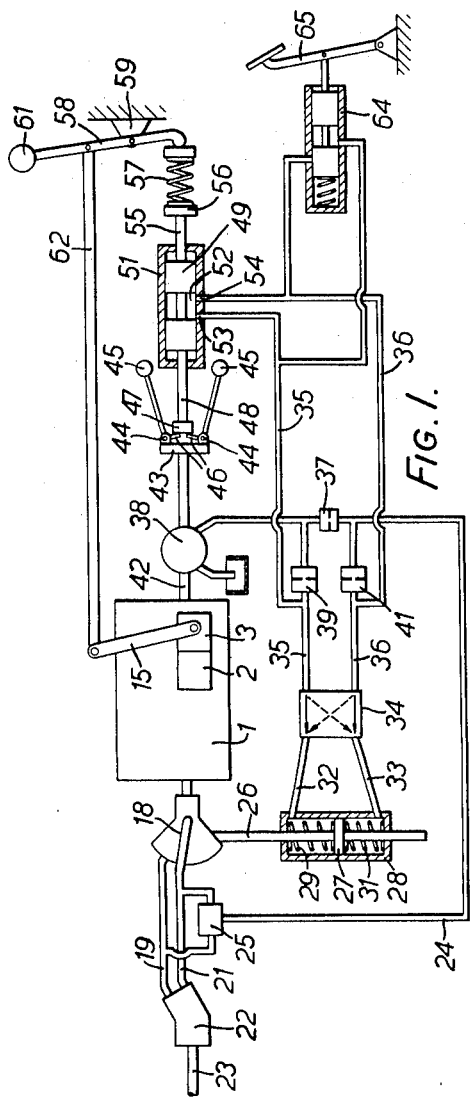
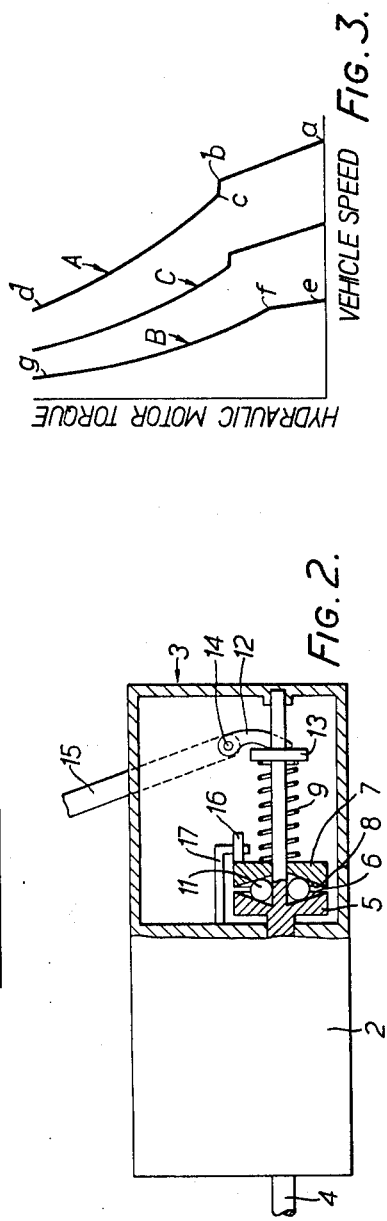
INVENTOR
BERTRAM C. KEMPSON
BY
Reynolds + Christmas
ATTORNEYS United States Patent Office 3,256,747
Patented June 21, 1966

3,256,747
INFINITELY VARIABLE TRANSMISSION
Bertram C. Kempson, Cheltenham, England, assignor to Dowty Hydraulic Units Limited, Cheltenham, England, a British company
Filed Jan. 7, 1964, Ser. No. 336,315
Claims priority, application Great Britain Jan. 11, 1963, 1,424/63
2 Claims. (Cl. 74—472)

This invention relates to an improvement or modification of the invention disclosed in my co-pending application, Serial No. 279,849, filed May 13, 1963, and now U.S.P. 3,167,907.

The present invention comprises the combination with an engine having an engine speed governor responsive to engine speed to control fuel flow from the engine to tend to maintain engine speed within a predetermined range, of an infinitely variable speed ratio power transmission adapted to transmit power from the engine to a load, the transmission having a transmission governor comprising a fly-weight unit rotatably driven by the engine and means responsive to the centrifugal force exerted on the fly-weights to reduce the transmission speed ratio in the event that engine speed is reduced below a speed within the predetermined range of the engine governor.

Where the engine speed governor is adjustable a connection may be provided from the engine speed governor to the transmission governor to adjust the spring loading thereof, so that the transmission governor will act to reduce transmission speed ratio when engine speed is reduced below the speed within the selected range of the engine governor.

One embodiment of the invention for use in the transmission of power on a vehicle from the vehicle engine to the ground engaging wheels will now be described with reference to the accompanying drawings in which, FIGURE 1 is a diagrammatic view of the embodiment, FIGURE 2 is a cross-section through the engine governor of FIGURE 1, and, FIGURE 3 is a graph illustrating operation of the embodiment.

Referring initially to FIGURE 1, the embodiment shown is for use on a vehicle for the transmission of power from a diesel engine 1 to the ground-engaging wheels in order to propel the vehicle. The diesel engine 1 includes a fuel injector jump 2 of conventional design which is controlled by an engine governor 3, again of conventional design. The engine governor 3 is shown in more detail in FIGURE 2. The fuel injection pump 2 is driven from the engine through a shaft 4 which extends through the pump to the governor 3. Within the governor a disc 5 having a conical surface 6 is connected directly to the shaft 4. A further disc 7 free on the shaft 4 and having a conical surface 8 is urged by spring 9 towards disc 5. The two discs are so mounted that the conical surfaces are adjacent and trap a number of spherical fly-weights 11. Rotation of the shaft and resulting centrifugal force on the fly-weights 11 will urge the disc 7 axially away from the disc 5 by virtue of the camming action of the fly-weights 11 on the conical surfaces 6 and 8. The loading of the spring 9 is adjusted by means of pivoted lever 12 acting on a spring cap 13 to load the spring 9. The lever 12 is secured by means of a shaft 14 to an external control lever, 15. Movement of the disc 7 in the axial direction engages a roller 16 attached to a fuel bar 17 extending into the pump 2. The fuel bar 17 will act in known manner to determine the delivery of fuel from the pump 2 to the engine 1. As shown in the drawing, movement of the bar 17 to the right will reduce fuel flow to the engine and movement to the left will increase fuel flow to the engine. Depending on the compression imparted to the spring 9 by the lever 12 and the driving torque exerted by the engine, the governor shown will adjust the fuel bar to tend to maintain the engine at a substantially constant speed. Referring again to FIGURE 1, the diesel engine 1 drives a variable displacement pump 18 which forms part of an infinitely variable speed ratio hydrostatic power transmission. The pump 18 is connected by flow and return pipes 19 and 21 to a fixed displacement hydraulic motor 22 having an output shaft 23. This output shaft is connected to a gear train to drive the ground-engaging wheels of the vehicle. The pump 18, the motor 22 and the pipes 19 and 21 form a closed circuit around which hydraulic liquid is pumped either in one direction or the other by the pump 18, the rate of flow depending on the selected displacement of the pump 18 and the speed at which it is driven by the engine 1. The hydrostatic transmission is compensated for loss of leakage by the supply of liquid at low pressure from a pipe 24 and a non-return valve assembly 25 to the pipe 19 or 21 at lower pressure in the well-known manner. For adjustment of the pump 18 a control rod 26 extends from the pump. This rod is adjusted by means of a servo piston 27 slidably mounted within a fixed cylinder 28. The rod 26 extends from piston 27 through both ends of the cylinder 28 in a sealed manner. A pair of springs 29 and 31 are provided within the cylinder 28 one on either side of the piston 27, these springs being pre-loaded to urge the piston 27 towards its central position. As shown in the drawing, downward movement of the piston 27 gives displacement to the pump 18 for rotation of motor 22 to propel the vehicle forwardly. In order for such downward movement to occur a hydraulic pressure difference is applied to the two ends of the cylinder 28 through the pipes 32 and 33, the pipe 32 carrying liquid at higher pressure. In order to reverse displacement of the pump 18 for reverse propulsion the pressure difference applied to the pipeline 32 and 33 may be reversed by means of a reversing valve 34. The pressure difference supplied into the valve 34 from pipes 35 and 36 extend from either side of a restrictor 37 through which the full delivery flows from the make-up pump 38. From the restrictor 37 liquid flows through pipe 24 into the transmission. In each of the pipes 35 and 36 a restrictor respectively 39 and 41 are located.

The pump 38 is driven by the end 42 of the crank shaft of the engine 1 extending from the end of the engine opposite to the pump 18. The shaft 42 extends through the pump 38 and terminates in a platform 43 on which at pivot points 44 a pair of fly-weights 45 are mounted. Arms 46 extend inwardly from the pivots 44 to engage a thrust bearing 47 from which extends a rod 48. The rod 48 terminates in a piston valve member 49 which is slidable within a cylinder 51. The valve member 49 includes a waisted portion 52 for co-operation with a pair of ports 53 and 54. The ports 53 and 54 are connected to the pipes 35 and 36 respectively. A further rod 55 projects from the piston valve member 49 in the opposite direction to the rod 48 to engage the end cap 56 of a spring 57. Spring 57 is adjustably loaded by means of a lever 58 pivotally mounted to a fixed fulcrum 59. The lever 58 has a handle 61 which may be adjusted angularly about its pivot for selection of governor settings. A link 62 pivotally interconnects the lever 58 with the engine governor lever 15.

In the system described when the engine 1 is rotating at an idling speed the lever 58 is in the position illustrated in which the loadings of both governor springs 9 and 57 are at a minimum. In particular the loading of spring 9 causes the engine to rotate at an idling speed. At this idling speed the delivery from make-up pump 38 is very small and the pressure drop at the fixed restrictor 37 is so small as to produce no substantial deflection of the servo piston 27. At such idling speed it is arranged that the spring 57 moves the piston valve 49 against centrifugal fly-weights so that the ports 53 and 54 are almost fully connected to one another through the waisted portion 52 thereby preventing creation of any pressure drop across the ends of the cylinder 28. The selected displacement of the pump 18 will therefore remain at zero and the vehicle will not move. Assuming now that the driver wishes to cause the vehicle to move forwardly, the valve 34 will be selected to the forward position indicated and the lever 58 will be moved to the right as seen in the drawing to increase the loading on the governor springs 9 and 57. Such increase in loading will increase fuel delivery to the engine which will then accelerate causing increase in the delivery from the pump 38 and increase in the centrifugal force on the fly-weights 45. The increased delivery from the pump 38 will cause a substantial pressure drop at restrictor 37 and the movement of fly-weights 45 will cause movement of the valve 49 in the sense to restrict the port 53. In this way a pressure difference is built up between the ends of the cylinder 28 to move rod 26 downwardly as seen in FIGURE 1 to give forward displacement of the pump 18.

In order to propel the vehicle in the reverse direction the driver will select reverse position of the valve 34 for accelerating the engine from the idling speed.

By combining the action of the engine governor and the transmission governor it is possible to obtain a very considerable range of torque variation on the transmission motor 22 with efficiency in operation of the engine and without requiring skilful or difficult manipulation of the controls on the part of the driver. This result is obtained by the relative settings of the engine and the transmission governors. The engine governor illustrated is of a simple conventional type which operates on reduction of speed to increase fuel flow to the engine and vice versa. It is well-known that such a governor for any given setting cannot control the engine to a fixed speed but will maintain the engine within a range of speeds, the speed of the engine falling slightly with increase in torque demanded of the engine. When the engine governor increases delivery of the fuel pump to maximum delivery per revolution of the engine, further increase in torque demanded from the engine will then cause stalling of the engine. This position of maximum fuel injection represents the lower end of the speed range for the particular setting of the engine governor. The other end of the speed range is that where the governor has reduced fuel injection to the engine to a minimum value. The reduction in engine speed for any one setting of the governor between minimum and maximum fuel injection is sometimes known as governor droop. The most advantageous way of combining the operation of engine and transmission governors is illustrated in FIGURE 3. The graph is plotted between vehicle speed and hydraulic motor torque. The curve A is obtained by plotting vehicle speed against motor torque when the handle 61 is moved to a maximum extent to give maximum engine speed. This action will give maximum loading to both governor springs 9 and 57. When the vehicle meets very little resistance to movement, the torque developed by the hydraulic motor 22 will be at minimum permitting the engine to rotate at approaching its maximum speed causing the fly-weights 11 to reduce fuel injection to a low value. Assume now that the vehicle meets a gradually increasing resistance, as for example by ascending a slope having a gradually increasing inclination. The motor will then be required to generate a gradually increasing torque which will be reflected through the transmission as a gradually increasing torque to be exerted by the engine 1 on the pump 18. This increasing torque will reduce engine speed within the droop of the engine governor. As a result the engine governor will increase fuel flow to the engine.

On the graph A the point $a$ represents maximum engine speed at low motor torque. Increase in motor torque will reduce engine speed and vehicle speed proportionally within the droop of the engine governor until at point $b$ the engine governor has increased fuel injection to a maximum. Between points $a$ and $b$ it is arranged that the centrifugal force of the fly-weights 45 overcomes the loading of spring 57 to the extent that port 53 remains closed whereby the full pressure drop at the orifice 37 is applied to the ends of the cylinder 28 to hold piston 27 at a fully deflected position representing maximum pump displacement. With increase in torque demand from motor 22 engine speed will drop from the point $b$ until at point $c$ spring 57 will have moved the piston valve member 49 against flyweights 45 to permit a small opening of the port 53. This will permit liquid flow between pipes 35 and 36 and by virtue of restrictors 39 and 41 will reduce the pressure difference across the ends of the cylinder 28 so that the springs may move the piston 27 towards the centre to reduce the selected displacement of the pump 18. This action will reduce the speed ratio of the transmission which will tend to stabilise the torque demanded by the pump 18 from the engine at a constant value. The reduction of speed ratio will continue along curve A from the point $c$ to the point $d$ as torque on the motor increases. The point $d$ represents the maximum torque which can be exerted by the hydraulic motor having regard to the maximum hydrostatic transmission pressure permitted in the transmission. It will be seen that for this one setting of the control lever 58 the control apparatus illustrated will control both the engine and the transmission to give a very large range of variation of torque at the hydraulic motor 22. From the point $c$ to the point $d$ the diesel engine is working at maximum fuel injection per revolution and is therefore working at a maximum efficiency.

In the curve A the portion from point $a$ to point $b$ represents a range of engine speed at which the engine speed governor controls the fuel flow to the engine. The portion of the curve A from $c$ to $d$ represents the range of operation of the transmission governor which responds at point $c$ to reduction of engine speed below a speed within the range covered by the portion $a$ to $b$. In this case the engine speed at point $c$ is lower than the engine speed at point $b$ in order to ensure that before the transmission governor comes into operation the governor has increased fuel flow per revolution of the engine to a maximum so that the engine is working at maximum efficiency.

It does not follow however that the engine speed at which the transmission governor starts to reduce transmission speed ratio should be lower than the lowest speed in the range of the engine speed governor. There are conditions where the speed at which the transmission governor starts to reduce transmission speed ratio could lie within the range of speeds at which the engine speed governor is operative. Reference is now made to curve B of the graph of FIGURE 3. This curve represents the operation of the engine at a minimum power giving speed which is only slightly faster than the idling speed and is obtained by slight movement only of the lever 58 from the idling position. The point $e$ on this curve represents the vehicle speed where the hydraulic motor torque is extremely small. As hydraulic motor torque is increased, the vehicle speed and the engine speed will reduce slightly. At the point $f$ the engine speed governor has increased fuel injection to about half the maximum value per revolution of the engine and at this point the transmission governor will begin to operate by arranging that the spring 57 will have just overcome the centrifugal force of the flyweights 45 to the extent to open port 53 slightly. With increase in motor torque the transmission governor will then reduce the speed ratio until maximum motor torque is obtained at point $g$. It will be seen that even with the engine operating at just over idling speed it is possible to obtain the maximum hydraulic motor torque although of course vehicle speed at this torque is quite low. Over the portion of curve B from $f$ to $g$ the governor will never reach maximum fuel injection per revolution of the engine. This is desirable owing to the fact that at such a low speed the engine could not run smoothly at full fuel injection per engine revolution. It will be clear that in this instance the transmission governor comes into operation at point $f$ which is clearly below a speed within the range of the engine governor.

Reference is now made to the curve C. This curve is obtained when the lever 58 is depressed to select approximately half engine speed. The curve obtained is quite similar to the curve A in that the engine speed governor is arranged to control over its full speed range and to reach a speed at which maximum fuel injection per engine revolution occurs. After a small further reduction in engine speed the transmission governor comes into operation with increase in hydraulic motor torque to reduce the transmission speed ratio.

In order to determine the relative operational ranges of the engine speed governor and the transmission governor for all positions of the lever 58 the portions of the levers 12 and 58 which engage the end caps of their respective springs 9 and 57 are provided with suitable cam surfaces and it is preferable to arrange for example that for selected engine speeds below half maximum speed the transmission governor should begin to reduce transmission speed ratio within the droop of the engine speed governor and that above half maximum engine speed the transmission governor should not begin to reduce transmission speed ratio until the engine speed governor has increased the fuel pump delivery to the maximum fuel flow per revolution of the engine.

In order to brake the vehicle fitted with the control apparatus shown in FIGURES 1 and 2, it is merely necessary to move the lever 58 to select a lower engine speed. Under such a condition the engine would effectively be driven by the momentum of the vehicle to a speed higher than that selected by the engine speed governor so that the fuel flow per revolution would be substantially zero and that the vehicle's momentum would be dissipated as heat in the engine radiator. With such braking, transmission speed ratio will remain at its maximum value. If it is desired further to increase the braking effect, a braking valve 64 operated by a brake pedal 65 may be provided connected across the pipes 35 and 36 which will operate on depression of the pedal 65 to reduce pressure difference between the ends of the cylinder 28. This will reduce the speed ratio of the transmission controllably and increase the energy dissipation rate within the engine by increasing the engine speed relative to the vehicle speed.

What I claim is:

1. The combination with an engine having an engine speed governor responsive to engine speed to control fuel flow to the engine to tend to maintain engine speed within a predetermined range, of an infinitely variable speed ratio power transmission adapted to transmit power from the engine to a load, the transmission having a transmission governor comprising a flyweight unit rotatably driven by the engine and means responsive to the centrifugal force exerted on the flyweights to reduce the transmission speed ratio in the event that engine speed is reduced below a speed within the predetermined range of the engine governor.

2. The combination as claimed in claim 1, wherein the governors are adjustable and are interconnected for adjustment by one control so that for any selected speed range of the engine governor, the transmission governor will come into operation at an engine speed below a speed within the range selected for the engine speed governor.

References Cited by the Examiner

UNITED STATES PATENTS

| | | |
|---|---|---|
| 1,259,090 | 3/1918 | Ferris et al. |
| 2,909,078 | 10/1959 | Nallinger. |
| 3,004,447 | 10/1961 | Sand. |
| 3,121,342 | 2/1964 | Breting et al. |
| 3,153,900 | 10/1964 | Pigeroulet et al. |

DAVID J. WILLIAMOWSKY, *Primary Examiner.*

DON A. WAITE, *Examiner.*

L. H. GERIN, *Assistant Examiner.*